Patented Aug. 16, 1938

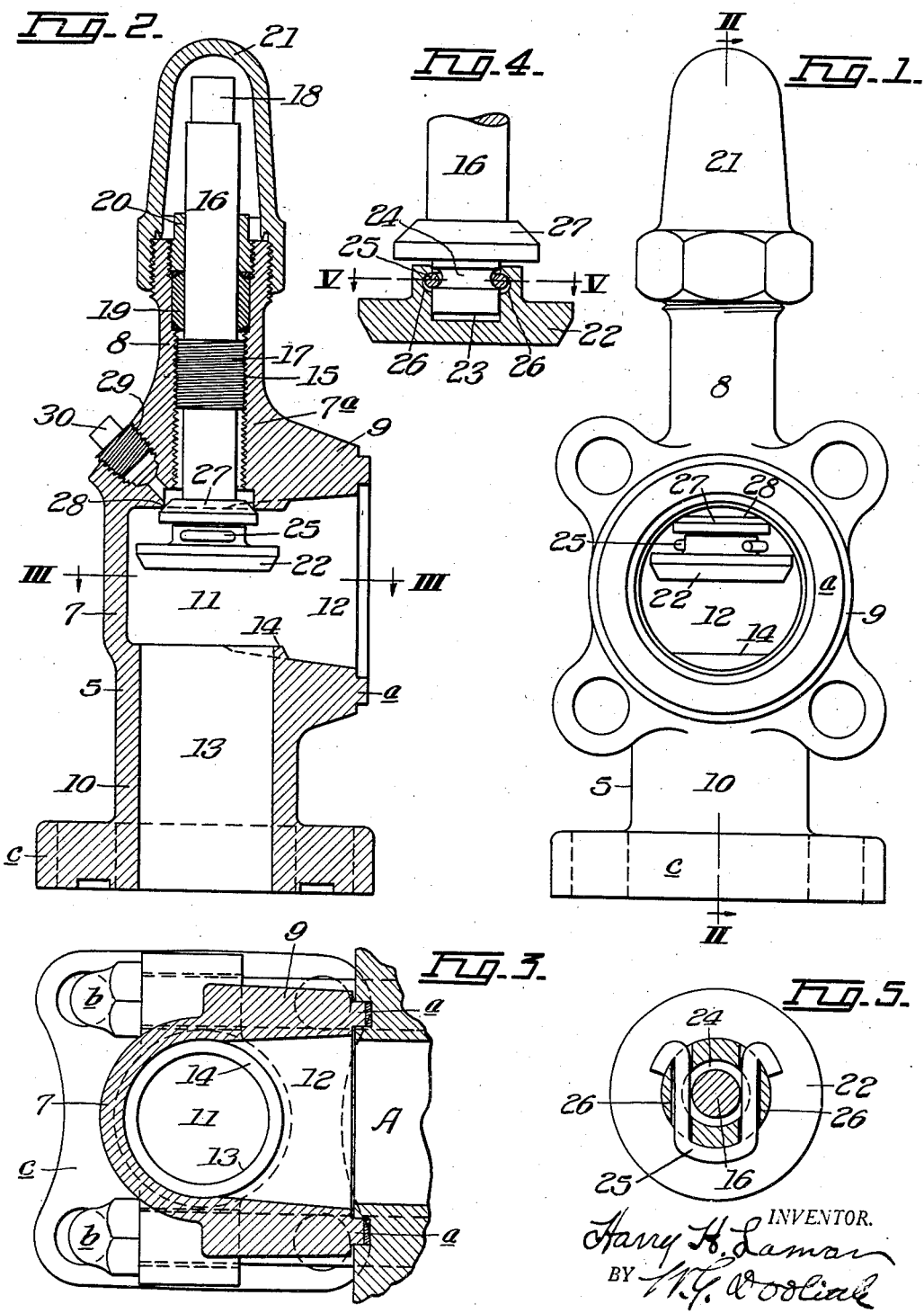

2,126,897

UNITED STATES PATENT OFFICE 2,126,897

VALVE

Harry H. Lamar, Wilkinsburg, Pa., assignor to Kerotest Manufacturing Company, Pittsburgh, Pa., a corporation of Pennsylvania Application April 27, 1936, Serial No. 76,544

1 Claim. (Cl. 251—155)

This invention relates to a new and improved drop forged valve and more particularly to a valve structure especially designed for use in connection with compressors employed in refrigeration systems. Valves of this character are generally known commercially, as compressor valves. They are designed to be associated with the compressors of refrigerator systems and be connected up therewith to function as inlet and shut-off valves, being attached to the compressors at the top, bottom or sides. As a rule these valves are made by casting and the casing embodies several parts. They usually include a combined main and a back seating valve, a valve chamber, a valve operating stem, inlet and outlet fluid passages and provision for a gauge connection.

In the manufacture of valves of the above described type, particularly where the main valve or valve head is of greater diameter than its associated operating stem, it has been the usual practice to employ in connection with the valve body proper, a threaded bushing or nipple having a valve seat thereon, which bushing or nipple is entered in and threaded to the body, thus producing an undesirable joint connection. This two part body construction permitted the stem and its head or heads to be assembled through one of the openings or fluid passages, which passage, as above described, then received the nipple or bushing on which the valve seat was formed.

The enlarged opening or passage in the valve body permitting the introduction of the large head required that the body be of large external dimensions in order to be of the required strength, which is objectionable and costly. Likewise, the manufacture of the supplemental parts is costly, usually requiring threaded attachment to the body as well as other additional machining operations on both supplemental parts and body.

Further, the employment of supplemental body parts is undesirable in certain uses, as for example, in the refrigeration art, where, due to the penetrability of the fluids employed, each joint or connection in the system must be leak-proof, necessitating silver-soldering the said supplemental parts to the body, which procedure entails additional expense and provides joints which must be destroyed to enable repair of the valve.

Among the objects of the present invention are; to provide a valve comprising a single piece housing of simple and efficient construction of a character especially designed for use in connection with compressors; a unitary valve casing or housing preferably of forged metal into which the movable and removable parts of the valve structure such as the valve-stem and valve head or heads may be readily assembled within the housing; and a construction in which machine operations are reduced to a minimum and in which an uninterrupted or non-restrictive flow of fluids through the valve is provided for.

My invention contemplates a valve including a unitary body which may be constructed of a minimum size for a given flow capacity. I have found that by relating the size of a flow passage, other than that directly controlled by the valve head, to the size of such valve head, the latter may be readily inserted through said passage and connected to its valve stem, thereby enabling the construction of a one-piece valve body and a body free of the usual supplemental body parts.

The invention may be advantageously employed in the production of valves having unitary bodies formed by forging, wherein the above-mentioned fluid passage may be initially formed in the body to permit the assembly in the manner set forth.

The invention may be more readily understood by a reference to the following description, taken in connection with the accompanying drawing, wherein:—

Fig. 1 is an elevational view of a valve constructed in accordance with my invention;

Fig. 2, a longitudinal section taken on the line II—II of Fig. 1;

Fig. 3, a transverse section taken on the line III—III of Fig. 2;

Fig. 4, an enlarged detail view partly in section, showing a manner of connection for the valve head and stem; and Fig. 5, a section taken on the line V—V of Fig. 4.

For the purpose of illustration, I have shown my invention embodied in what is known in the art as a compressor valve, commonly employed with compressors of refrigeration systems, but it will be understood that the invention is adaptable for other uses.

Referring to the drawing, 5 designates generally a valve casing or body of a unitary structure including a central portion 7, an integral head portion 7a, an upper extension or stem-receiving portion 8, an inlet nozzle or portion 9 and an outlet nozzle or portion 10, the said nozzle portions being disposed in angular relation.

The central portion 7 is hollow, forming a valve chamber 11 in open communication with an inlet passage 12 and an outlet passage 13; said chamber having an area of sufficient size to permit an unrestricted flow of fluid therethrough. 14 designates a valve seat disposed between the valve chamber 11 and the outlet passage 13.

The neck portion 8 of the body has a central bore 15, in alinement with the valve seat 14, and is designed to receive an operating valve stem 16, a portion of said bore and stem having threaded connection at 17 for actuation of the latter, as by a wrench or handwheel (not shown) which may be applied to the squared outer terminal end 18 of such stem.

The stem 16 is suitably sealed within the portion 8 against the escape of fluid as by a packing 19 with its associated follower 20, the latter having threaded engagement with the outer portion of the bore 15. 21 designates a cap screw-threaded on the outer end of the body portion 8 for enclosing the operating end 18 of the valve stem.

The inlet nozzle 9 is formed with a suitable face $a$ for direct connection with the wall of a compressor A by means of suitable bolts $b$, and the outlet nozzle 10 is flanged as at $c$ for connection with suitable piping, not shown. Obviously other types of connections may be employed in place of $a$ and $c$ as desired; but I find such connections desirable as they do away with separable nipples and other members heretofore usually employed.

As illustrated and as preferred, I provide a separable valve head 22 adapted to be directly associated with the outlet passage 13 and movable by the stem 16 into and out of engagement with the valve seat 14. This valve head is removably connected with the lower end of the valve stem 16 by any suitable means. For example, the head 22 is formed with a socket 23 for receiving the stem end, the latter having an annular groove 24 therein. 25 designates a bifurcated pin or clip, the parallel terminals of which are inserted through spaced transverse openings 26 in the head 22 for straddling engagement with the stem end in the groove 24, as particularly shown in Figs. 4 and 5, thereby securing the head and stem longitudinal separation.

Assuming the valve stem 16 to be positioned in the bore 15 the valve head with a portion in valve chamber 11, the head may be inserted through the inlet passage 12, which latter has a diameter slightly larger than the maximum diameter of the valve head 22, and conveniently applied to the stem and be connected to the latter by member 25. The valve chamber 11 is sufficiently larger than the valve head 22 to insure an uninterrupted and unrestricted flow through the body when the head is in open position.

It will be seen that by the construction stated, the external dimensions of the body 5 may be reduced to a minimum, it being necessary only to provide walls of sufficient thickness about the chamber, passages and bore, to give adequate strength against the fluid operating pressures, and it is not necessary to provide additional material or size to accommodate added body parts, thus resulting in a material economy in size, weight and machining costs over present practices.

In the valve illustrated, I prefer to employ a back-seating construction including a valve portion 27 formed on the stem 16 for engagement with a provided valve seat 28 between the bore 15 and the chamber 11. Likewise, an inclined opening 29 is formed in the body 5 opening into the bore 15 outwardly of the seat 28, and is threaded to receive suitable connections for taking pressure readings or to charge the connected system with fluid. A removable plug 30 normally closes said opening 29.

Where such integral valve portion 27 is employed on the stem 16, the latter is readily inserted in its bore 15 through the outlet passage 13, prior to the application of the valve head 22 thereto.

An additional and important feature of my invention resides in the construction of the valve body 5, whereby it may be formed by drop forging, to provide an economical manufacture and to provide a valve body which will be leak-proof when employed with the highly penetrable refrigeration fluids.

I claim:

A valve body having an attaching portion, a chamber open at said portion and having its longitudinal axis perpendicular to the plane of attachment of said portion, the body having a bore and a passage communicating with the chamber and arranged in alignment on opposite sides of the chamber with their longitudinal axis intersecting the longitudinal axis of the chamber, the wall of said chamber flaring in the direction of the open end of the chamber and approximately from a plane parallel to the aforesaid plane, the second mentioned axis lying in the second mentioned plane, the body having substantially flat surfaces in the chamber in parallelism to each other and to the longitudinal axis of the chamber providing seats at the bore and passage, the body having projections raised from the flared wall and extending to the second mentioned plane to provide portions of said surfaces.

HARRY H. LAMAR.